March 24, 1964  L. SCHWAB  3,126,263
GAS DEFLECTING AND FILTERING
Filed Nov. 16, 1959  2 Sheets-Sheet 1
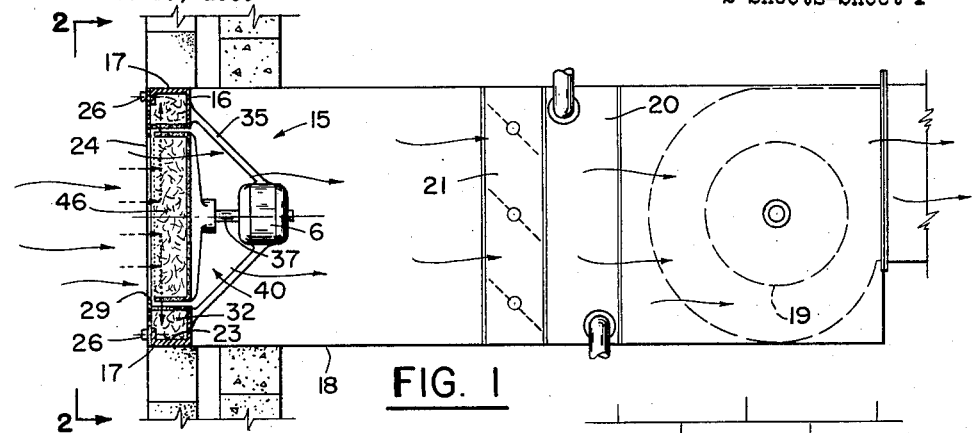
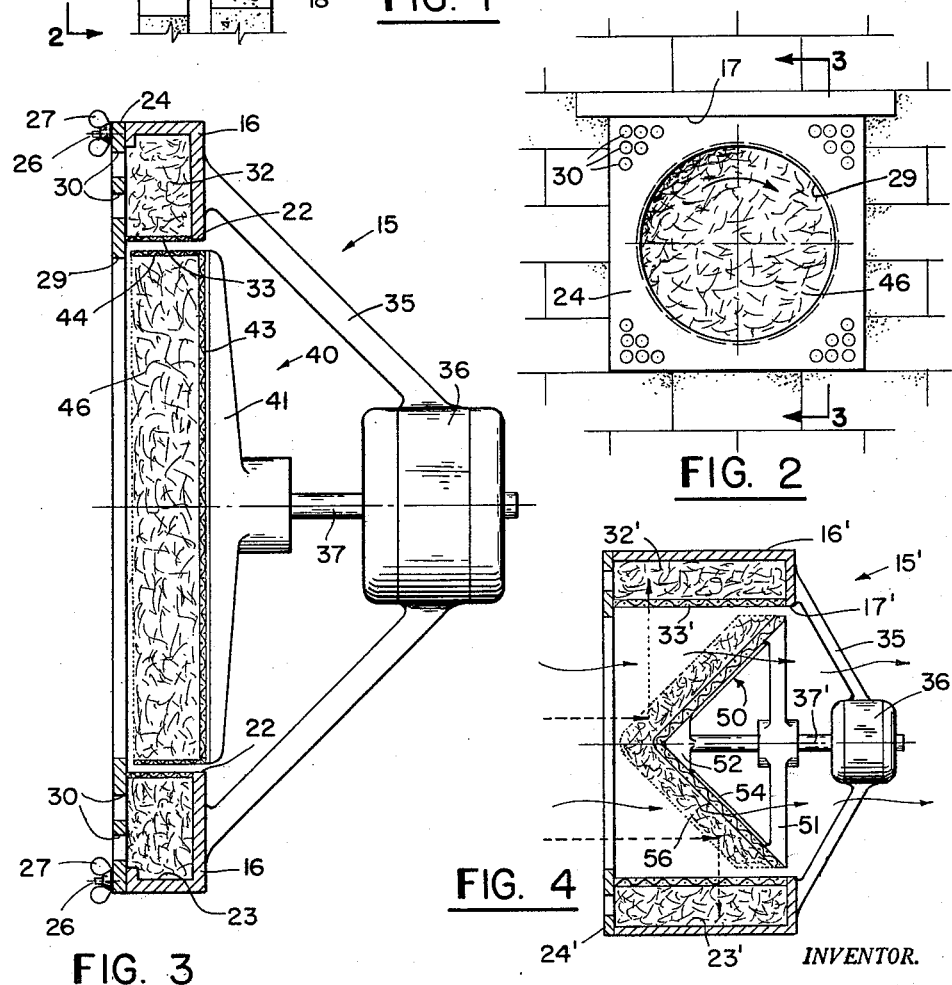
INVENTOR.
LOUIS SCHWAB
BY
Hane & Nydick
ATTORNEYS March 24, 1964 — L. SCHWAB — 3,126,263
GAS DEFLECTING AND FILTERING
Filed Nov. 16, 1959 — 2 Sheets-Sheet 2

INVENTOR.
LOUIS SCHWAB
BY Hane & Nydick
ATTORNEYS

United States Patent Office 3,126,263
Patented Mar. 24, 1964

3,126,263
GAS DEFLECTING AND FILTERING
Louis Schwab, 2000 W. Lee Road, Orlando, Fla.
Filed Nov. 16, 1959, Ser. No. 853,292
12 Claims. (Cl. 55—317)

This invention relates to air circulating means and, more particularly, to apparatus for purifying air as by removing particles or odoriferous substances from a stream of air.

Various types of air distribution systems are employed for directing a stream of air into or through air treatment, utilization or exhaust systems. In many instances, it is extremely desirable, if not necessary, to remove particles entrained in such air, such as in removing particles from air circulated through air conditioning apparatus, particles contained in exhaust fumes and particles contained in various gases used in chemical processes.

It is, therefore, among the principal objects of the present invention to provide air treatment apparatus which will effectively remove particles entrained in a stream of directed air in a simple and efficient manner, without altering the temperature or characteristics of the air or other gas, and at a relatively low cost.

Still another object of the present invention is to provide air treatment apparatus that can be readily used for either treating air entering or leaving associated equipment, and which may be readily adapted for all types of industrial, home, domestic, commercial and medical or chemical purposes.

An additional object of the present invention is to provide air treatment apparatus of the type described which can be further used for deodorizing, cleaning and decontaminating heavily laden exhaust fumes, such as from internal combustion engines, kitchens and the like, so as to prevent the particles entrained in such exhaust fumes from accumulating in or damaging associated equipment.

A more specific object of the present invention is to provide air treatment apparatus of the above type which is also especially useful for removing pollen from the intake of air conditioning systems, and which utilizes centrifugal force to radially direct air entrained particles outwardly from the intake opening of air directing apparatus, and which includes filter means for trapping such deflected contaminants for removal at various intervals.

Other objects of the invention are to provide air treatment apparatus bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

FIG. 1 is a cross sectional view of apparatus made in accordance with the present invention in actual use in an air flow control apparatus;

FIG. 2 is a front view taken along lines 2—2 of FIG. 1;

FIG. 3 is an enlarged cross sectional view of the apparatus shown in FIG. 1, made in accordance with one form of the present invention;

FIG. 4 is a view similar to FIG. 3 showing a slightly modified form of construction;

Figure 5:
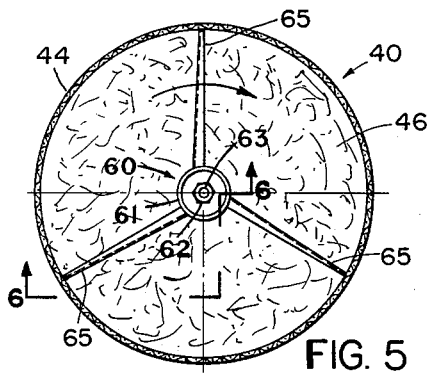
FIG. 5 is a front view of a centrifugal separator made in accordance with the present invention having a radial deflector for more positively directing air entrained particles outwardly from the path of flow.

Referring now to the drawing, and more particularly to FIGS. 1 to 3 thereof, gas treatment apparatus 15 made in accordance with the present invention is shown mounted within an opening 17 at one end of an inlet duct 18, through which gas, such as air, is drawn by a circulating fan 19. This apparatus may also include a heater 20 and gas flow control apparatus 21. It will thus be recognized that the gas treatment apparatus 15 made in accordance with the present invention is interposed in the path of flow of gas entering the duct 18, so as to remove entrained particles therefrom, in a manner hereinafter more fully described.

The gas treatment apparatus 15 shown in FIGS. 1 to 3, includes a main frame 16 having a central circular opening 22 and an outwardly opening compartment 23 surrounding such opening 22 within which a filter 32, such as a mass of fibrous material, may be disposed. The frame 16 also includes a plurality of outwardly extending mounting studs 26 which cooperate with wing nuts 27 to secure a cover plate 24 in overlying engagement with the filter material filled compartment 23.

The cover plate 24 is also provided with a central opening 29 of slightly smaller size than the opening 22 of the frame 16. A circular band 33 of mesh screen material is secured between the frame 16 and cover plate 24 substantially concentrically with the openings 22, 29 of the frame and cover plate. The screen 33 allows air and entrained particles to enter into contact with the filter material 32, as will be hereinafter more fully described, so that such particles may be entrapped within the filter material 32 and air allowed to exhaust outwardly through ports 30 in the cover plate 24.

A centrifugal separator 40 made in accordance with one form of the present invention, is shown in the drawing to include a spider 41 upon which a substantially circular screen or perforate plate 43 is secured. A perforate side wall 44 integral with the periphery of the perforate plate 43 and extending substantially coextensively with the screen 33 of the main frame 16, defines a shallow tray within which filter material 46 is secured. A bracket 35, also forming a part of the main frame 16, supports a motor 36 having a drive shaft 37 concentrically with the opening 22 of the main frame 16, and upon which the spider 41 of the centrifugal separator 40 is secured.

It will now be recognized that as gas, such as air, is drawn through the opening 22 of the main frame 16, in any manner whatsoever, rotation of the centrifugal separator device 40 will cause any particles entrained by the air to be trapped within the filter material 46 and driven radially outwardly under centrifugal force through the perforate side wall 44 and screen plate 33, into trapped engagement within the filter material 32 of the main frame 16. Any air moving radially outwardly under such centrifugal force is allowed to exhaust outwardly through the ports 30 of the cover plate 24, so as to prevent interference with the movement of such deflected particles. On the other hand, the perforate plate 43 allows the purified air to enter into the duct 18 of the apparatus for use with the associated equipment, such as for air conditioning, chemical process, or exhaust purposes.

With reference now to FIG. 4 of the drawing, a slightly modified form of gas treatment appartus 15', is shown to include a main frame 16' of slightly greater depth having an inlet opening 17', cover plate 24', and compartment 23', all substantially identical to the corresponding parts hereinbefore described. However, this frame 16' is provided with a substantially deeper mesh screen 33' which thus increases the capacity of the housing 23' to contain a larger amount of filter material 32'. In this arrangement, a centrifugal separator 50 includes a spider 51 and a forward extension 52 which support a substantially conical perforated plate 54 upon the drive shaft 37' of the motor 36' which is carried upon the bracket 35' of the main frame 16'. The filter material 56 is secured to the facing side of the perforated conical plate 54, to engage with air entering into the system. The conical configuration of the separator efficiently deflects any air entrained particles striking the surface of the filter material 56, outwardly through the mesh screen 33' and into the filter material 32' of the main frame 16'. The particular shape of the perforated plate 54 thus allows the deflected particles to pass more quickly into the filter material 32' of the main frame 16', rather than having to pass through the entire radial distance between the point of impact and the peripheral edge of the rotating filter material 56.

Figure 6:
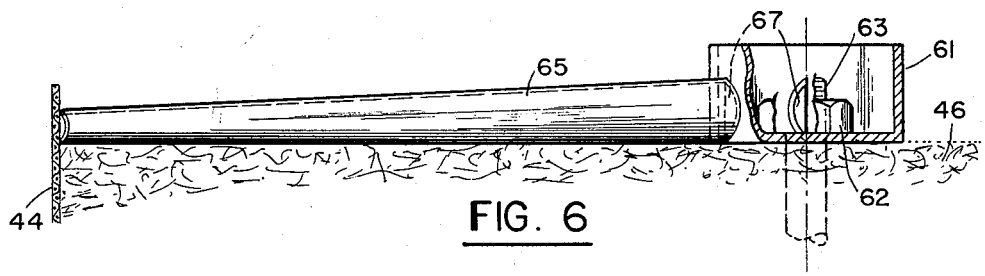
FIG. 6 is an enlarged fragmentary cross sectional view taken along line 6—6 of FIG. 5.
Figure 8:
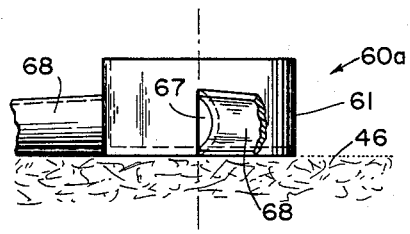
FIG. 8 is an enlarged fragmentary transverse cross sectional view taken along line 8—8 of FIG. 7.

Referring now to FIGS. 5 and 6 of the drawing, a radial deflector attachment 60 which may be used with the aforementioned centrifugal separators, is shown to include a cup-shaped hub 61 having a nut 62 for secured engagement upon an externally threaded terminal portion 63 of the operating motor drive shaft, upon which the centrifugal separator 40 is secured. A plurality of circumferentially spaced apart and radially extending arms 65 are secured at their innermost ends to the hub 61 and terminate short of the perforated side wall 44 of the centrifugal separator. Each of the arms 65 is preferably of channel shaped cross sectional configuration opening in the direction of rotation of the assembly. Such channels have the effect of more rapidly and effectively directing air entrained particles impinging upon the surface of the filter material 46 radially outwardly into association with the filter material carried by the main frame of the assembly. The hub 61 is also provided with circumferentially spaced ports 67, each communicating with one of the arms for directing flow radially outwardly from the hub as well.

Figure 7:
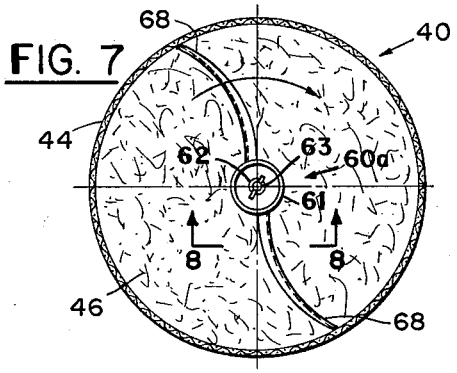
FIG. 7 is a view similar to FIG. 5, showing a slightly modified form of radial deflector assembly.

While the arms 65 of the embodiment illustrated in FIG. 5 are straight, a slightly modified form of construction of a radial deflector 60a is shown in FIG. 7, which also includes the hub 61 and securement nut 62, but which is provided with curved arms 68 that extend radially outwardly from the hub 61 toward the perforate side wall 44 of the centrifugal separator. Each of these curved arms 68 is also preferably of channel shaped cross sectional configuration, opening in the direction of rotation of the assembly, for the purposes described. The arms 68 are also curved rearwardly at their outermost ends in a direction away from the direction of rotation of the assembly in order to provide for the smooth and even distribution of removed air entrained particles toward the filter material of the main frame.

Figure 9:
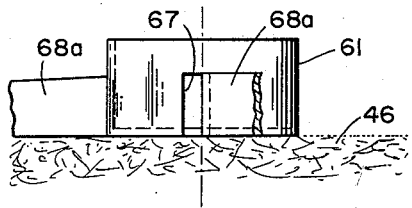
FIG. 9 is a view similar to FIG. 8, of a slightly modified form of the invention.

In FIG. 9 of the drawing, the arms 68a are substantially flat rather than curved, i.e., channel-shaped, so as to provide a simpler form of construction.

Figure 10:
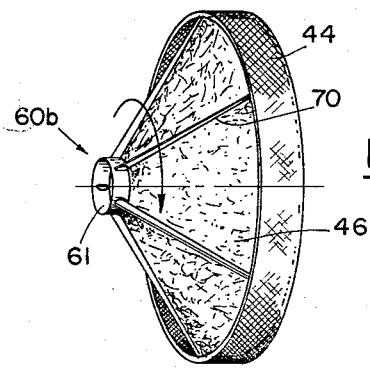
FIG. 10 is a perspective view of still another form of radial deflector made in accordance with the present invention, in assembly with a centrifugal separator.

With reference now to FIG. 10 of the drawing, still another embodiment of a radial deflector 60b made in accordance with the present invention is shown to include a hub 61 and a plurality of substantially straight, radially outwardly, and inwardly diverging arms 70 which not only direct air entrained particles removed from the air radially outwardly toward the filter material of the main frame, but which also serve to direct the removed particles further into the filter material along the path of flow of the air stream. This type of radial deflector 60b is particularly useful in connection with the conical type centrifugal separator shown in FIG. 4 of the drawing, so as to provide for proper distribution of removed particles throughout the filter mass 32'.

It will now be recognized that this apparatus can be conveniently and effectively used with all types of gas distribution equipment, wherever it is desired to remove or control the quantity of particles entrained therewithin.

For example, the instant invention provides means for collecting grease contained in the gaseous exhausts from kitchens. By positioning the rotating filtration unit 15 at the intake of the exhaust line from a restaurant kitchen, the grease is stripped from the air stream moving through said line. From time to time the grease thus accumulated at the readily accessible position can be removed, thereby eliminating the hazards now existing in conventional exhaust systems.

It will be apparent, accordingly, that the instant invention comprises a frame having an opening for directing a stream of gas therethrough, and gas permeable rotatable filtration means within said opening. In consequence, the rotating filtration means centrifugally removes contaminants from a stream of gas passing through said opening.

While various changes may be made in the detail construction, it shall be understood that such changes shall be within the spirit and scope of the present invention as defined by the appended claims.

What I claim as new and desire to protect by Letters Patent of the United States is:

1. Air treatment apparatus comprising, in combination, a frame having an opening directing a stream of air therethrough, a trap supported around said opening, a gas permeable centrifugal separator supported within said opening directing air entrained particles toward said trap out of a stream of air passing through said opening, said frame comprising a housing, said trap comprising a mesh screen surrounding said opening, filter means substantially filling said housing around said mesh screen, a cover plate substantially enclosing said filter material within said housing, said cover plate having ports extending therethrough for maintaining the interior of said housing at atmospheric pressure, said centrifugal separator comprising a motor having a drive shaft concentric with said opening, a spider secured to said drive shaft, and a perforate plate carried by said spider with said opening having peripheral portions adjacent to said mesh screen surrounding said opening, further comprising filter material carried by one side of said perforate plate facing the inward flow of air through said opening, and wherein said perforate plate is substantially flat.

2. An air treatment apparatus comprising, in combination, a frame having an opening directing a stream of air therethrough, a trap supported around said opening, a gas permeable centrifugal separator supported within said opening directing air entrained particles toward said trap out of a stream of air passing through said opening, said frame comprising a housing, said trap comprising a mesh screen surrounding said opening, filter means substantially filling said housing around said mesh screen, a cover plate substantially enclosing said filter material within said housing, said cover plate having ports extending therethrough for maintaining the interior of said housing at atmospheric pressure, said centrifugal separator comprising a motor having a drive shaft concentric with said opening, a spider secured to said drive shaft, and a perforate plate carried by said spider with said opening having peripheral portions adjacent to said mesh screen surrounding said opening, further comprising filter material carried by one side of said perforate plate facing the inward flow of air through said opening, and wherein said perforate plate is substantially conical having one apex end facing into the path of flow of air into said opening.

3. Air treatment apparatus comprising, in combination, a frame having an opening directing a stream of air therethrough, a trap supported around said opening, a gas permeable centrifugal separator supported within said opening directing air entrained particles toward said trap out of a stream of air passing through said opening, said frame comprising a housing, said trap comprising a mesh screen surrounding said opening, filter means substantially filling said housing around said mesh screen, a cover plate substantially enclosing said filter material within said housing, said cover plate having ports extending therethrough for maintaining the interior of said housing at atmospheric pressure, said centrifugal separator comprising a motor having a drive shaft concentric with said opening, a spider secured to said drive shaft, and a substantially circular perforate plate (43) carried by said spider and a perforate side wall (44) carried by the periphery of said perforate plate 43, with said opening having peripheral portions adjacent to said mesh screen surrounding said opening.

4. Air treatment apparatus as set forth in claim 3, further comprising filter material carried by one side of said perforate plate facing the inward flow of air through said opening.

5. Air treatment apparatus as set forth in claim 4, wherein said perforate plate is substantially flat.

6. Air treatment apparatus as set forth in claim 4, wherein said perforate plate is substantially conical having one apex end facing into the path of flow of air into said opening.

7. Air treatment apparatus as set forth in claim 3, further comprising air entrained particle deflector means carried by said perforate plate facing toward the inward flow of air into said opening for directing air entrained particles radially outwardly toward said mesh screen.

8. Air treatment apparatus as set forth in claim 7, wherein said deflector means comprises a plurality of radially extending arms.

9. Air treatment apparatus as set forth in claim 8, wherein each one of said arms is of generally channel shaped cross sectional configuration concave in the direction of rotation of said perforate plate.

10. Air treatment apparatus as set forth in claim 8, wherein said radially extending arms are substantially straight.

11. Air treatment apparatus as set forth in claim 8, wherein said radially extending arms are curved radially outwardly and circumferentially in a direction opposite to the direction of rotation of said perforate plate.

12. Air treatment apparatus as set forth in claim 8, wherein said radially extending arms are substantially straight and diverge radially outwardly in a direction parallel to the longitudinal axis of said shaft in the direction of air flow.

References Cited in the file of this patent

UNITED STATES PATENTS

| | | |
|---|---|---|
| 585,188 | Davis | June 29, 1897 |
| 970,397 | Rush | Sept. 13, 1910 |
| 1,075,736 | Spiegel | Oct. 14, 1913 |
| 1,415,294 | Baldwin | May 9, 1922 |
| 1,789,871 | Knight | Jan. 20, 1931 |
| 2,167,786 | Taylor | Aug. 1, 1939 |
| 2,382,387 | Alford | Aug. 14, 1945 |
| 2,500,747 | Ellis | Mar. 14, 1950 |
| 3,018,896 | Gewiss | Jan. 30, 1962 |

FOREIGN PATENTS

| | | |
|---|---|---|
| 597,809 | Germany | May 31, 1934 |
| 882,494 | France | Mar. 1, 1943 |
| 1,019,799 | France | Nov. 5, 1952 |